United States Patent [19]

Nikolov et al.

[11] 4,049,041

[45] Sept. 20, 1977

[54] METHOD OF AND APPARATUS FOR FLUID DIE STAMPING

[75] Inventors: Ivan Dimov Nikolov; Hristo Georgiev Kortenski; Dimiter Tanev Dimitrov; Asparuh Mihaylov Antonov, all of Sofia, Bulgaria

[73] Assignee: Institute po Metalosnanie i Technologia na Metalite pri Ban, Sofia, Bulgaria

[21] Appl. No.: 606,208

[22] Filed: Aug. 20, 1975

[30] Foreign Application Priority Data

Aug. 30, 1974 Bulgaria .................................. 27602

[51] Int. Cl.² .................... B22D 27/12; B22D 27/14
[52] U.S. Cl. ................................... 164/120; 164/321
[58] Field of Search .................... 164/120, 319, 321

[56] References Cited

U.S. PATENT DOCUMENTS

| 117,397 | 7/1871 | Ells | 164/120 |
| 3,613,768 | 10/1971 | Awano et al. | 164/319X |
| 3,664,410 | 5/1972 | Groteke | 164/120 X |

FOREIGN PATENT DOCUMENTS

1,238,919  7/1971  United Kingdom ................. 164/120

*Primary Examiner*—Ronald J. Shore
*Attorney, Agent, or Firm*—Karl F. Ross

[57] ABSTRACT

A system for the die stamping of a fluid comprises a male die member which is forced into a die cavity to compress and spread the fluid material therein. A piston in this die member is advanced after the die member is arrested by a shoulder of the female die member to compress gas ahead of this piston and increase the pressure at selected locations along the face of the male member at which cavities are provided to communicate this gas pressure to the fluid.

3 Claims, 2 Drawing Figures

METHOD OF AND APPARATUS FOR FLUID DIE STAMPING

The invention relates to a method of and an apparatus for fluid die stamping. It is usable for the stamping of products generally in engineering.

Two basic varieties of this stamping method are known, depending on the way in which the stroke of the upper stamping die movement is confined.

When the stroke of the upper stamping die is limited by the maximum force exerted by the machine and when due to this force, the stamping die is kept closed until the complete solidification of the material, favorable conditions for the compensation of the natural shrinkage are provided and thanks to this a good structure is achieved, since the solidification is carried out under a continuously acting pressure.

An essential disadvantage of this method is that it requires high precision dosing of the material fed into the stamping die and the unavoidable dosing inaccuracies are resulting in disproportions in the stamped part height. The method hardly finds practical application because of this disadvantage.

The disadvantage of the arrangements to effect this method is the great complexity of the dosing devices as well as their incapability to provide sufficiently precise dosing of the material, poured into the stamping die.

Precision part sizes are achieved by means of limitation of the length of the upper stamping die stroke, i.e. when the upper stamping die reaches a rigid arrestor when reaching the required size. The initial fluid or semifluid material in this method is metered in with a certain surplus, which is expelled from the stamping die through narrow grooves in compensation cavities, formed specially for this purpose, before the upper stamping die has reached the arrestor.

This method has the disadvantage that it is not able to provide satisfactory density and homogeneous structure of the parts. When the upper stamping die had reached the arrestor, it still exerts a very high pressure on the semifluid material, since the grooves, leading to the compensation cavities are very narrow. Due to the fact that from one side the fluid material is not compressible and from the other side it contracts when solidifying as a result of shrinkage, very soon after the upper stamping die had reached the arrestor, the pressure on the solidifying material ceases its action and the latter continues solidifying freely without any pressure action. As a result, structural faults appear in the part being stamped, known from the castings: concentrated macro shrinkage cavities, axial porosity and gas blowholes, due to the gas separation during the solidification.

An important disadvantage of the arrangements to effect method is this that they are not able to provide pressure actions, which could compensate the material shrinkage up to the end of the solidifying process.

Both methods for fluid and semifluid stamping and the arrangements to effect them have the common disadvantage that the part being stamped is enclosed at the end of the stamping stroke on its whole surface from metal die parts, having a cooling effect. As a result, the solidification of the part proceeds from the surface towards the core, where structural faults will appear due to the material shrinkage.

In the stamping method consisting in restriction of the force, it is necessary — in order to reduce these faults — to apply very high pressure to deform the material, acting over its whole volume enclosed by the already solidified skin, whereas in the method using a limiting of the stamping stroke the faults can not be influenced at all.

The object of the present invention is to provide a method of an an apparatus for fluid die stamping and an apparatus to effect it, avoiding the disadvantages of the aforementioned methods for fluid and semifluid die stamping, providing as a result uniform, dense structures and exact dimensions of the finished parts, giving considerable liberty in dosing the material.

The object is attained in that when the upper stamping die has reached its extreme position, pressures still continue to act on the gradually solidifying material, compensating its shrinkage, while some areas of the product surface must be provided for solidifying as last.

The male stamping die portion is initially moved and when it has reached its limit position and has ceased its stroke, the male stamping die continue to exert a pressure, produced by the compressed air or by some other gas, enclosed in the stamping die cavities between the material being stamped and the stamping die at the very beginning of the operation stroke.

The apparatus to effect the method consists of a stamping die, provided with one or several cavities opened towards the top or lateral surfaces of the stamped part in such a way that to be closed by the material being stamped at the start of the working stroke. The stamping die can be connected with the stamping unit of the machine by means of pneumatic piston, and the gas collecting cavities and the compression space in front of the piston are interconnected by means of an adjustable reversing valve. The pneumatic piston can also be fixed to the female part of the stamping die.

The advantages of this method for fluid and semifluid stamping consist in the resulting uniform structure and the high density of the products, while having practically sufficient liberty in dosing the material and at relative low values of the final pressures during the forming process.

The above and other objects, features and advantages of the present invention will become more readily apparent from the following description, reference being made to the accompanying drawing in which.

Figure 1:
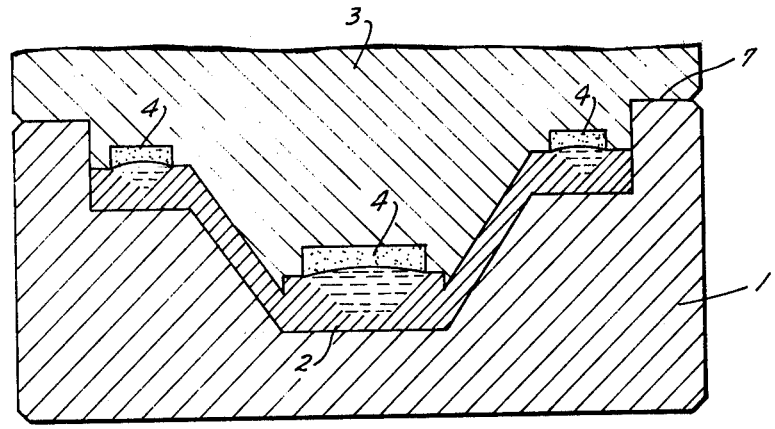
FIG. 1 is a cross-section through the die; and Z

The female stamping die 1 is provided with a cavity 1a for the shape forming of the article 2. The upper or male stamping die 3 has a plunger 3a to close the female stamping die 1 inwards of a support shoulder 7 and determining the height dimensions of the article. The stamping die is provided with one or several cavities 4, opened towards the top or lateral surface of the article and located preferably above it.

At the beginning of the working cycle, the air or some other gas being in the soace between the upper stamping die 3 and the material being stamped 2 will be trapped in the cavities 4. Thereafter, with increasing the pressure on the semifluid material in the stamping die will be increased the gas pressure in the cavities 4, respectively. When the stamping die is closed entirely and the pressure of the stamping unit ceases its action because of the material shrinkage, the air in cavities 4, compessed up to the pressure of stamping, will continue its action on the material, ensuring in that way the formation of a dense structure. Since the air enclosed in the cavities is acting as a heat insulator, it provides some delay in the solidification of the material, onto which the gas pressure is acting directly. Thanks to this, the efficiency of this pressure as a means for faults elimination during the structure formation process is extremely high.

Besides as a pressure source for concluding the stamping process and as a heat insulator, the cavities 4 serve at the same time as compensation cavities, in which the excess material fed during the pouring is collected.

Figure 2:
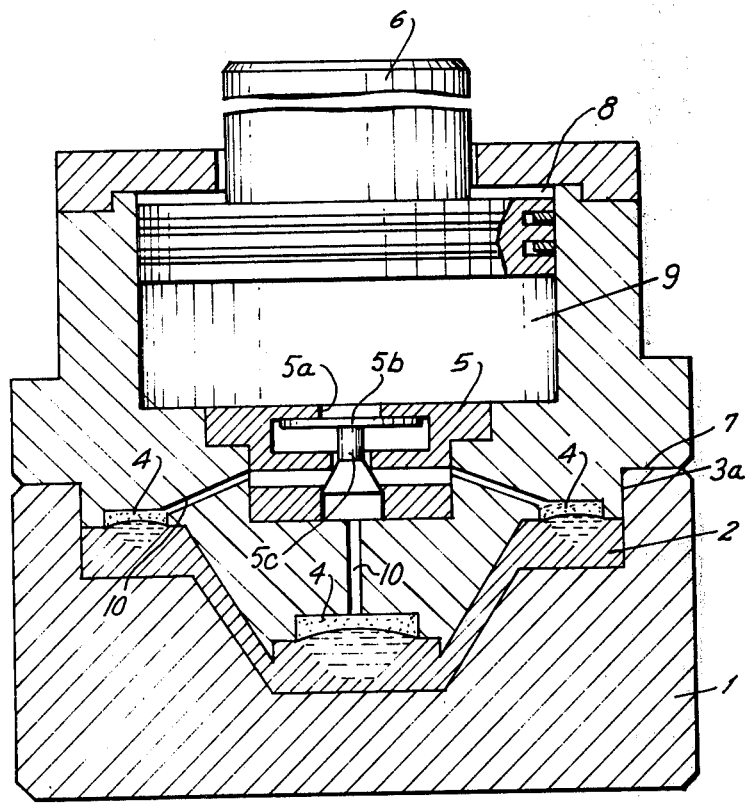
FIG. 2 is a cross-sectional view showing the improvement of the present invention.

In the version, illustrated schematically in FIG. 2, the deformation force is transmitted to the stamping unit by means of pneumatic piston 6. The cylinder 8 and its compression space 9 in front of the piston 6 and the gas collecting cavities 4 are interconnected by means of adjustable reversing valve 5, which is open under the action of the gas pressure, produced by piston 6 in direction of the compression space 9 in front of the piston 6 through channels 10 towards the gas collecting cavities 4.

Ahead of the compression compartment 9, the valve 5 is provided with an aperture 5a closed by a plate 5b mounted on a stem 5c which can be displaced downwardly by the buildup of pressure in compartment 9 to enable the air in this chamber to pass around the plate 5b and into the plurality of bores 10 communicating with the local cavities 4.

Once the plunger portion 3a of the male die member is received in the female die member 1, pressure buildup at the cavities 4 urges the valve member 5b, 5c into its upper position so that compartment 9 is closed off from the passages 10.

As the male member advances, its distributes the fluid 4 in the mold cavity and, because the gas in cavities 4 is trapped, allows a preliminary compression of this gas.

When further advance of the male member is prevented by the abutment or shoulder 7, the piston 6 is driven downwardly and, overcoming the pressure beneath the plate 5b, causes the valve to open and apply higher pressure to the cavities.

The method can be applied also by means of other versions of the tool, inclusive the types restricting the stamping stroke with respect to the force, whereby the aforedescribed features are preserved. It is sufficient for this purpose to remove the restricting arrestors in stamping die 3, closing the female stamping die 1. The pneumatic piston can also be located in the fixed part of the stamping die, depending on the design of the article and the stamping die itself. In this case its driving will be effected by means of the stamping force, too.

We claim:

1. A method of fluid die stamping which comprises: pouring a fluid material between members of a stamping die having a stamping surface comprising a stationary member and a movable member provided with at least one cavity extending over a limited region of said stamping surface;

forcing the movable member into the stationary member to distribute and compress said fluid in said cavity; and arresting the movable member and forcing a piston located within said movable member toward said cavity to compress a gas in said movable member and force said compressed gas through at least one channel leading to the cavity to exert additional pressure on the fluid material between the members and exposed to the cavity at said limited region.

2. An apparatus for fluid die stamping which comprises:
   a. a die which contains a stationary stamping member and a movable stamping member;
   b. means for arresting the movement of the movable member to prevent its stamping surface from engaging the stationary member at its stamping surface;
   c. a cylinder formed in said movable stamping member;
   d. a piston slidable in said cylinder and defining a compressed gas compartment therein;
   e. at least one cavity located on a limited part of the stamping surface of the movable stamping member; and
   f. at least one channel connecting said cavity and said cylinder for communicating gas pressure from said compartment to said cavity upon continued advance of said piston upon arresting of the movable member.

3. An apparatus for fluid die stamping which comprises:
   a. a die which contains a lower female stationary stamping member and an upper male movable stamping member;
   b. a shoulder attached to the upper male movable member;
   c. a rim attached to the lower female stationary member and juxtaposed with said shoulder;
   d. a cylinder formed in said upper male movable member;
   e. a piston slidable in said cylinder and defining a compressed gas compartment therein;
   f. at least one cavity located in a limited part of the stamping surface of the upper male movable stamping member;
   g. at least one channel connecting said cavity and said cylinder for communicating gas pressure from said compartment to said cavity upon continued advance of said piston upon arresting of the movable upper male stamping member by engagement of said shoulder by said rim;
   h. an adjustable reversing valve interposed between the channel and the cylinder.

* * * * *